US009761122B1

(12) United States Patent
Orrell et al.

(10) Patent No.: US 9,761,122 B1
(45) Date of Patent: Sep. 12, 2017

(54) ZONED-ALERTING CONTROL SYSTEM FOR AUGMENTING LEGACY FIRE STATION ALERTING SYSTEM LACKING CONFIGURABLE ZONE

(71) Applicant: EC Company, Portland, OR (US)

(72) Inventors: Jon M. Orrell, Oregon City, OR (US); Hassan Sajadi, Scottsdale, AZ (US)

(73) Assignee: EC Company, Portland, OR (US)

( * ) Notice: Subject to any disclaimer, the term of this patent is extended or adjusted under 35 U.S.C. 154(b) by 0 days.

(21) Appl. No.: 15/240,955

(22) Filed: Aug. 18, 2016

(51) Int. Cl.
*H04L 12/28* (2006.01)
*G08B 27/00* (2006.01)

(52) U.S. Cl.
CPC .................................. *G08B 27/001* (2013.01)

(58) Field of Classification Search
CPC .................................................... G08B 27/001
USPC ........................................................ 340/6.12
See application file for complete search history.

(56) References Cited

U.S. PATENT DOCUMENTS

2002/0057197 A1* 5/2002 Mathney .............. G08B 27/001 340/506
2008/0040669 A1* 2/2008 Plocher et al. ........... G06F 3/16 715/727
2012/0196556 A1* 8/2012 Perrott et al. ........ G08B 27/001 455/404.1
2013/0107041 A1* 5/2013 Norem et al. ......... H04N 5/225 348/143
2013/0121224 A1* 5/2013 Sugitani ................ H04J 3/1694 370/311
2014/0320282 A1* 10/2014 Zhang .................... G08B 7/066 340/502
2015/0195493 A1* 7/2015 Childers ................ H04N 7/181 348/143
2016/0275780 A1* 9/2016 Macy et al. ........ H04L 12/1845

* cited by examiner

*Primary Examiner* — Santiago Garcia
(74) *Attorney, Agent, or Firm* — Stoel Rives LLP; Robert R. Teel

(57) ABSTRACT

A microprocessor-based electronic control system allows firefighters and emergency response personnel the ability to assign individual sleeping quarters, dorm rooms or an area of a facility to a specific apparatus/vehicle/unit that is dispatched through an existing electronic fire station alert notification system. The control system controls actuation of devices throughout a building from any location as well as from remote locations. The devices can be anything such as lights, speakers, appliances, watering systems, and other devices. This is accomplished by a network of nodes including a master controller and a plurality of slaves. The system is modular and scalable according to need. It is also flexible for use on various applications. Programmable switches are used for displaying statuses and for selecting various options.

13 Claims, 7 Drawing Sheets

800

OLED Rocker Images AND changes due to the OLED switch activities

| Address Decimal | Address HEX | Image Description | Pressing the top switch result in the OLED to display the image at this address | Pressing the bottom switch result in the OLED to display the image at this address | Option Mode |
|---|---|---|---|---|---|
| 0 | 00 | brightness adjustment | 01 | 00 (cycle through the 4 brightness ) | 1 |
| 1 | 01 | OPTION1 | 02 | 00 | 1 |
| 2 | 02 | OPTION2 | 03 | 12 | 1 |
| 3 | 03 | OPTION3 | 04 | 13 | 1 |
| 4 | 04 | OPTION4 | 05 | 14 | 1 |
| 5 | 05 | OPTION5 | 06 | 15 | 1 |
| 6 | 06 | OPTION6 | 07 | 16 | 1 |
| 7 | 07 | OPTION7 | 08 | 17 | 1 |
| 8 | 08 | OPTION8 | 09 | 18 | 1 |
| 9 | 09 | OPTION9 | 0A | 19 | 1 |
| 10 | 0A | OPTION10 | 0B | 1A | 1 |
| 11 | 0B | OPTION11 | 0C | 1B | 1 |
| 12 | 0C | OPTION12 | 0D | 1C | 1 |
| 13 | 0D | OPTION13 | 0E | 1D | 1 |
| 14 | 0E | OPTION14 | 01 | 1E | 1 |
| 15 | 0F | RESERVE | | | |
| 16 | 10 | ERROR | NO CHANGE | NO CHANGE | |
| 17 | 11 | PROGRAMMING | NO CHANGE | NO CHANGE | |
| 18 | 12 | OPTION2 SELECTED | NO CHANGE | 01 | 2 |
| 19 | 13 | OPTION3 SELECTED | NO CHANGE | 01 | 3 |
| 20 | 14 | OPTION4 SELECTED | NO CHANGE | 01 | 4 |
| 21 | 15 | OPTION5 SELECTED | NO CHANGE | 01 | 5 |
| 22 | 16 | OPTION6 SELECTED | NO CHANGE | 01 | 6 |
| 23 | 17 | OPTION7 SELECTED | NO CHANGE | 01 | 7 |
| 24 | 18 | OPTION8 SELECTED | NO CHANGE | 01 | 8 |
| 25 | 19 | OPTION9 SELECTED | NO CHANGE | 01 | 9 |
| 26 | 1A | OPTION10 SELECTED | NO CHANGE | 01 | 10 |
| 27 | 1B | OPTION11 SELECTED | NO CHANGE | 01 | 11 |
| 28 | 1C | OPTION12 SELECTED | NO CHANGE | 01 | 12 |
| 29 | 1D | OPTION13 SELECTED | NO CHANGE | 01 | 13 |
| 30 | 1E | OPTION14 SELECTED | NO CHANGE | 01 | 14 |

FIG. 8

ZONED-ALERTING CONTROL SYSTEM FOR AUGMENTING LEGACY FIRE STATION ALERTING SYSTEM LACKING CONFIGURABLE ZONE

TECHNICAL FIELD

The present disclosure relates generally to a fire station alerting system (FSAS) and, more particularly, to techniques for enhancing the FSAS to establish configurable alert zones within the station.

BACKGROUND INFORMATION

An FSAS is generally comprised of a station-alert receiver and a station-alert transmitter. Examples of station-alert receivers include a Model 6 Fire Station Transponder and a Model 6203 Fire Station Unit, both of which are available from Zetron, Inc. of Redmond, Wash. Examples of station-alert transmitters include a Model 26 Status/Control Panel and an Internet Protocol (IP) Fire Station Alerting (FSA) system, both of which are also available from Zetron, Inc. The station-alert receiver is typically located at a fire station to provide, among other things, an audio interface to the station's public address (PA) system. And the station-alert transmitter is typically located at an emergency telephone call dispatch center to provide an interface between manual dispatch or computer aided dispatch (CAD) and the station-alert receiver of the FSAS.

In some embodiments, after a dispatcher enters information about an emergency situation into a CAD system, the CAD system then automatically selects one or more fire stations and specific resources (e.g., a fire engine, also known as an apparatus) capable of providing a rapid and suitable response to the situation. The CAD system then provides the information to the station-alert transmitter of the FSAS. In response, the station-alert transmitter sends alert information in the form of data packets or voice transmission through a radio or wired communication link—e.g., private telephone communication lines or IP wide area network (WAN)—to one or more station-alert receivers at addressed stations having the desired resources.

When it receives the alert information, a station-alert receiver switches an internal relay connecting the station-alert receiver to the fire station's PA system. At that point, the station-alert receiver causes an audible tone—specific sounds corresponding to an apparatus and its response team—to be played through a loud speaker. In some embodiments, the audible tone is played throughout the station so that everyone in the station can hear the alert and respond if they are members of the response team for the apparatus identified by a pattern of sounds included in the audible tone. Following the tone, the station-alert receiver typically actuates audio equipment so as to broadcast a dispatcher's voice from the PA system and thereby allow dispatch to announce details of the emergency situation. Concurrently, the station-alert receiver may also activate its other control relays that activate fire station lights, disable cooking appliances, raise bay doors, or perform other actions reducing response time.

Previous attempts at delivering flexible zoned-alerting in areas of the fire station have employed a holistic approach entailing installation of new station-alert receiver equipment or other proprietary equipment by which to receive specific data protocols and radio signals. In other words, such systems are generally intended for new fire stations or for situations in which preexisting FSAS equipment is entirely replaced. But some stations having preexisting station-alert receivers and insufficient financial resources available for an expensive FSAS upgrade might still benefit from flexible zoned-alerting.

SUMMARY OF THE DISCLOSURE

Techniques of the present disclosure provide options to retrofit an existing station-alert receiver to accommodate control over which dispatch alarms are audible in individual zones (rooms). Retrofitting an existing station-alert receiver (by attaching to it a zone controller that controls relays in zones) provides an affordable solution for controlling flexible zoned-alerting, thereby lessening financial barriers to reducing sleep disruptions of station personnel who would otherwise be awoken by audible tones meant for members of other response teams. Accordingly, this disclosure describes a zoned-alerting control system that, at the physical layer, operates in conjunction with an existing station-alert receiver and is not reliant upon proprietary data transmission protocols between dispatch and system components at the station. For example, the system is activated by an existing station-alert receiver's relay outputs and is not dependent on any specific data protocols or radio signals from systems at a dispatch center. Thus, the zoned-alerting control system may be used to retrofit any existing FSAS without changing underlying alerting infrastructure at the station.

The system improves a firefighter's or a rescue personnel's health and wellness by reducing sleep disruptions. Firefighters and rescue personnel may use the disclosed technology to assign their designated sleeping quarters (e.g., bunk rooms), or other zones in the station, to receive only specific dispatch alert calls, such as those calls for specific resources (e.g., vehicles). The system interfaces with existing relays to provide alerts to users based on their specific selections, thereby reducing disruptions otherwise caused by conventional station-wide, fixed-zone-alerting techniques. Thus, the system provides fire station personnel an ability to suppress superfluous alerts, which improves sleep and reduces stress attributable to irrelevant alert disruptions. The ability to screen and localize dispatch alerts within a fire station improves the overall performance and health of firefighters and rescue personnel.

Additional aspects and advantages will be apparent from the following detailed description of embodiments, which proceeds with reference to the accompanying drawings.

BRIEF DESCRIPTION OF THE DRAWINGS

FIG. 8 is a table describing a list of various display states and resource selections.

DETAILED DESCRIPTION OF EMBODIMENTS

Figure 1:
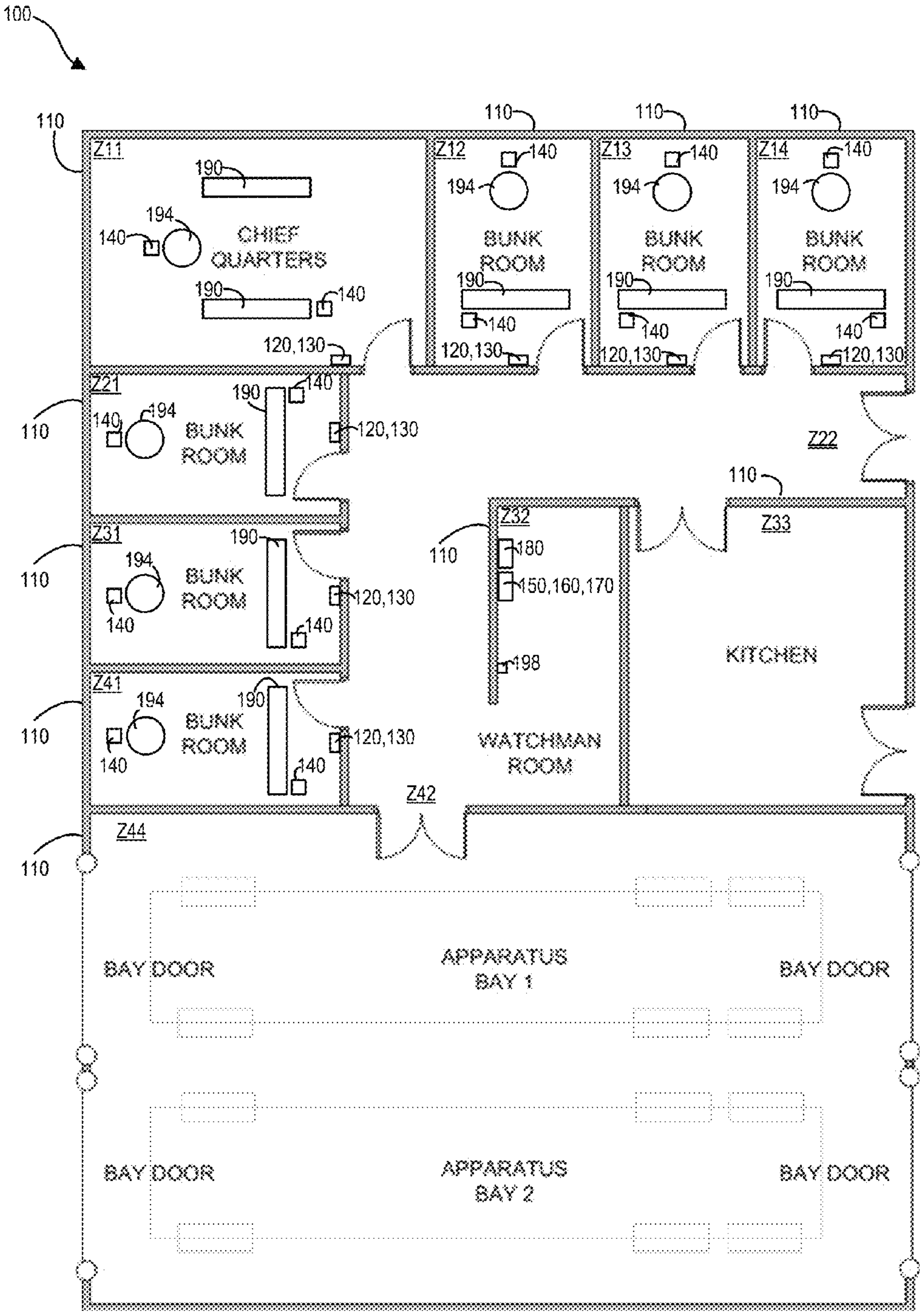
FIG. 1 is a top plan view of a fire station floor plan showing a layout including various rooms and other configurable alert zones within the station.

FIG. 1 shows a layout of a typical fire station 100. Station 100 includes individual rooms 110 that may house a fire-fighter, emergency medical technician (EMT), ambulance technician, lieutenant, battalion chief, or other personnel. Each individual room 110—in addition to other zones indicated in FIG. 1 by a reference label "Z" followed by a two-digit address—may be configured as an independent alert zone for receiving dispatch alerts that are calling for a particular selected apparatus while suppressing other alerts that may be calling for different (unselected) resources. If personnel periodically switch room or equipment assignments, then the zones may be readily re-configured by the personnel to provide alerts that are appropriate for the new assignment.

Each alert zone is configurable from a user interface 120 mounted in a standard electrical-type faceplate (FIG. 6) that is located next to existing room-light switches. This arrangement provides an ability to use industry standard electrical mounting devices and products. User interface 120 is operatively associated with a selector-interface slave module 130 that provides data to and control over user interface 120 and auxiliary relay outputs 140. A display panel 150, operatively associated with a display-driver slave module 160, is another type of user interface included in a watchman room (zone Z32) to provide an indication of selections made to each user interface 120 in alert zones.

As explained subsequently in further detail, slave modules 130 and 160 are networked with and controlled by communications from a zone-controller master module 170. As a brief initial overview, however, when a legacy FSAS station-alert receiver 180 signals an alert at its relay outputs, master module 170 provides serial communication commands received by selector-interface slave modules 130 to control states (on, off) of associated auxiliary relay outputs 140 and thereby control preexisting alerting system lights 190 and paging speakers 194 based on the serial communication commands. Some fire stations also have paging microphones 198 for local, in-building paging. To allow activation of paging speakers 194, microphones 198 utilize built-in switches to trigger auxiliary inputs of modules that in turn actuate relays controlling the PA system in zones.

When an emergency dispatch alarm call is received at the station—for example, a call for a fire engine—only the zone(s) selected for engine will receive the dispatch signal as the zone relays are activated thereby energizing existing alert lights and audio paging speakers. In other words, a selector-interface slave module 130 at zone Z21 receives serial communication commands from zone-controller master module 170 in response to master module 170 detecting a signal on one of its inputs indicating that an alert received by legacy FSAS station-alert receiver 180 is applicable to zone Z21 based on selections previously made at user interface 120 of zone Z21. Accordingly, selector-interface slave module 130 at zone Z21 switches states (on and off) of its associated auxiliary relay outputs 140 to control preexisting alerting system lights 190 and paging speakers 194 in response to the network communication commands provided through a network protocol such as serial (e.g., RS-485) or packet (e.g., Ethernet) data.

Figure 2:
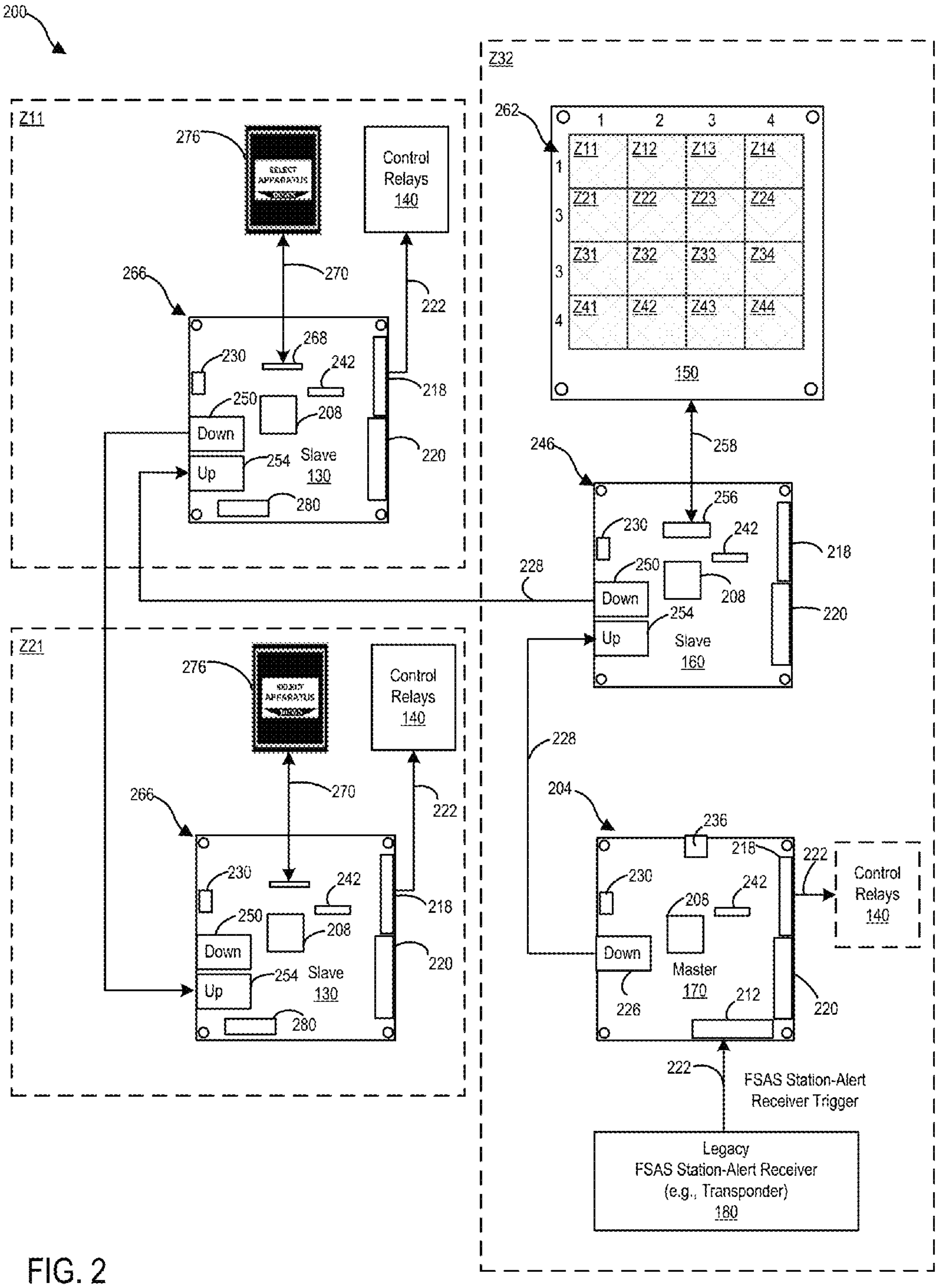
FIG. 2 is a block diagram showing components of a zoned-alerting control system enhancing a preexisting station-alert receiver of a legacy FSAS, according to one embodiment.

FIG. 2 is a block diagram providing an overview of components forming a zoned-alerting control system 200, in which the components show in greater detail a subset of those depicted in FIG. 1. Consistent with the example of FIG. 1, system 200 includes a plurality of networked control modules that allow predefined dispatch alerts to be passed to certain zones (e.g., rooms) within a fire station or emergency response facility.

The right side of FIG. 2 indicates that master module 170, along with display-driver slave module 160 and display panel 150, may be mounted in an enclosure that is located in zone Z32, which (in FIG. 1) is the watchman room that also stores legacy FSAS station-alert receiver 180.

Master module 170 includes a printed circuit board assembly 204 having a microprocessor 208. In some embodiments, microprocessor is a PIC microcontroller available from MicroChip Technology Inc. of Chandler, Ariz. as part no. PIC18F46J11, which is an 8-bit microcontroller unit (MCU) including a flash program memory and 3,800 bytes of SRAM.

Microprocessor 208 is configured to generate serial communications, monitor eight main trigger inputs 212 that receive voltage signals from dry contact outputs of existing FSAS station-alert receiver 180, switch seven 12 volt direct current (VDC) outputs 218 to control associated relays 140, and monitor other optional auxiliary inputs. For example, assembly 204 also includes eight auxiliary trigger inputs 220 to allow an additional level of control over outputs 218 to associated relays 140.

An example use of trigger inputs 220 controlling outputs 218 is as follows. A doorbell provides a signal to a trigger input 220. That signal, when detected by microprocessor 208, causes microprocessor 208 to change the state of a corresponding output 218. That output 218 actuates a relay to signal a bell or other alert equipment (e.g., lights, speakers, PA systems) in certain zones configured to receive an indication that the doorbell has been pushed. Another example, discussed previously, is microphones 198 that trigger paging speakers 194, thereby allowing fire station audio paging microphones to act as input sources holding relays in an on position during a page call. Thus, system 200 includes independent dry contact triggered inputs, separate from the main dispatch input triggers, that provide additional options to trigger any output relay in system 200.

All relay connections have the ability to receive an 18 AWG cable 222, but wire gauge size is dependent on current load and voltage drop requirements.

To facilitate a daisy-chain linear bus interconnection to all other modules in system 200, assembly 204 includes an eight-pin modular jack port 226 suitable for establishing a network connection 228 with a downstream slave module (e.g., display-driver slave module 160). Examples of network cabling used for network connection 228 include RS-422 (RS-485 serial), CAT-5 (Ethernet), or other network connection.

Assembly 204 is powered with 12 VDC, which is applied from a power source (not shown) through a two-pin screw terminal 230 or via port 226. An optional battery backup power supply may supply power, e.g., in the event of a power failure.

There is also a mini-universal serial bus (USB) port 236 to facilitate a connection to a host computer (not shown) used for programming software, capturing data, or controlling specific system functions. Accordingly, master module 170 may be connected with a host computer via a USB interface, which allows the host computer to monitor system status, capture historical data, and provide additional control options. To facilitate firmware programming of microprocessor 208, a four-pin header 242 provides a connection for a programming interface adapter.

Display-driver slave module 160 includes a printed circuit board assembly 246, which is substantially similar to assembly 204. Several differences are noted as follows. To facilitate the daisy-chain interconnection to all other modules in system 200, assembly 246 includes a pair of eight-pin modular jack ports: a first port 250 suitable for extending network connection 228 to a downstream switch-interface slave module 130, and a second port 254 suitable for establishing network connection 228 with an upstream module (e.g., master module 170). Assembly 246 is also powered by 12 VDC through a power source or battery backup as described previously, but power can also be received through either port 250 or port 254. Assembly 246 connects to display panel 150 through a 14-pin header 256 and a 14×28 AWG ribbon cable 258 suitable for sending serial peripheral interface (SPI) control and power signals to display panel 150.

Display panel 150 has an on-board processor (not shown) to process the SPI commands from display-driver slave module 160. The commands control the presentation on a grid layout of 16 liquid crystal display (LCD) regions 262 of 64×32 pixels each that present a status screen in both color and text formats. Display panel 150 includes a 14-pin header (not shown) used to connect via cable 258 to display-driver slave module 160 that provides power and communication signals.

Each display region presents selections made at corresponding user interfaces 120 (FIG. 1) of zones in station 100. The selections are presented at corresponding regions based on an addressing format that matches the zone address scheme mechanically configured (e.g., by DIP switches, described subsequently) on a selector-interface slave module 130. In other words, when an alert selection is made for a zone, the selection is shown at a region of display panel 150 that has an address matching that of the zone. Each vehicle type that has been selected is presented according to a customizable theme on display panel 150, the theme including both color and text graphics. The color and text displayed are designated by the fire district or department administration, with unlimited naming conventions and 64 different colors. A default theme for groups of selectable vehicles is as follows: engine (red), truck (yellow), squad (green), rescue (blue), and chief (white). For example, if a user is assigned to an engine and is sleeping in zone Z21, the user makes that selection at the Z21 user interface and that selection is shown as a red "Engine" box in the Z21 display region of display panel 150.

Selector-interface slave module 130 includes a printed circuit board assembly 266, which is substantially similar to assembly 246. Several differences are noted as follows. A connector 268 provides, through a 12-pin cable assembly 270, a connection to an alert-configuration selector switch 276 (FIG. 6) of user interface 120 that a user manipulates for selecting alerts desired in an associated zone. For example, a user can select which vehicle they are assigned to so that any dispatch calls for that vehicle are provided to the user's room. Individual room control via alert-configuration selector switch 276 allows personnel an ability to assign their zones to a specific vehicle.

Each assembly 266 also includes an eight-position DIP switch 280 used to manually establish a unique eight-bit address for each selector-interface slave module 130 present in system 200. An address is manually set by switching up or down each of the eight pin positions to select a binary digit at the position. The eight selections then collectively form an eight-bit address. Although the present embodiment provides for 16 addresses on display panel 150, it is possible to define addresses for many more selector-interface slave modules 130 in a single network.

The left side of FIG. 2 indicates that zones Z11 and Z21 each have an identical assembly 266. Although these assemblies have different addresses and series (daisy-chained) connections to other modules, the underlying components of modules in zones are identical. Furthermore, modules share a common printed circuit board layout and hardware design, which further enhances the modularity of the design.

FIG. 2 also illustrates the various cables used for interconnecting system 200 components. Serial communication cabling between modules is Category 5 UTP cabling. Modules can be powered using 18/2 AWG UTP cabling to terminal 230 or through communication cables via eight-pin modular jack ports. Cabling used for main trigger inputs and auxiliary local trigger inputs can be any conductor size between 18 AWG and 24 AWG. The cable size is dependent upon installation conditions and the distance to existing FSAS station-alert receiver 180, and other equipment connection specifications.

Figure 3:
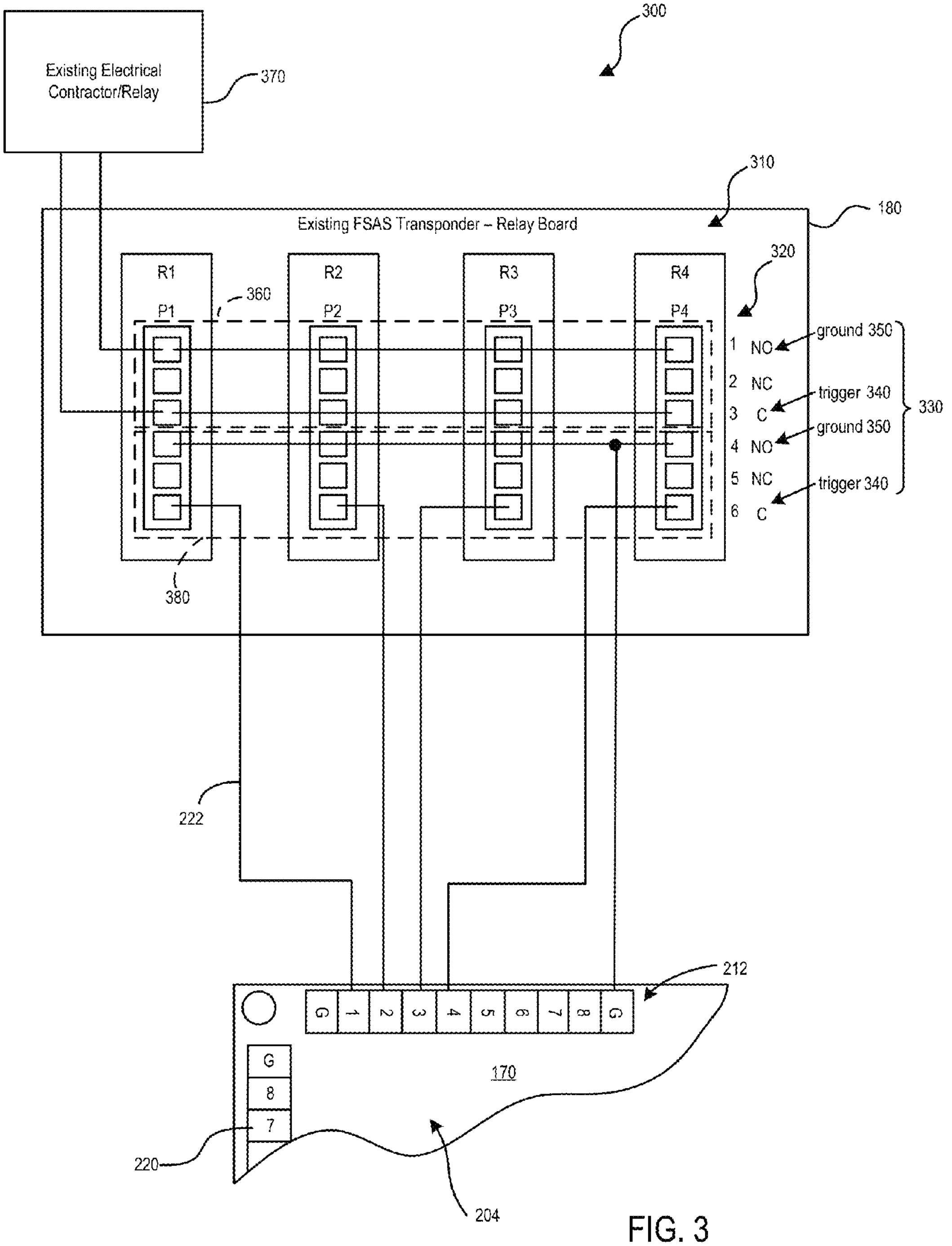
FIG. 3 is a block diagram showing connections between a zone-controller master module and dry contact relay outputs of the preexisting station-alert receiver of FIG. 2.

FIG. 3 shows example connections 300 between master module 170 and existing FSAS station-alert receiver 180. FSAS station-alert receiver 180 has a set of four dry contact trigger relays 310 (R1-R4). Each member of the set of relays 310 is a single throw double pole (STDP) relay having a corresponding set of six wire-terminal blocks 320 (P1-P4) that act as outputs 330 providing dry contacts of existing FSAS station-alert receiver 180.

Outputs 330 are activated in response to a particular apparatus dispatch alert call received by FSAS station-alert receiver 180. A particular relay is tripped in response to FSAS station-alert receiver 180 receiving an alert identifying a corresponding resource. For example, a leftmost relay of relays 310 trips in response to FSAS station-alert receiver 180 receiving an alert dispatch call for a station truck. Similarly, a rightmost relay of relays 310 trips in response to FSAS station-alert receiver 180 receiving an alert dispatch call for a station engine. Then, a voltage (e.g., a high or low logic level) is established across common (C) contacts 340 and normally open (NO) contacts 350 of terminal 320 that correspond to the triggered relay. That voltage level is detected at an associated one of inputs 212 on master module 170. For example, when a relay is latched by the specific alert call, NO and C contacts are connected, thereby pulling associated input 212 to ground. This change in voltage level is detected by microprocessor 208 (FIG. 2), which then starts its sequence of program logic to generate serial communications for broadcasting the alert to selector-interface slave modules 130.

According to one embodiment, a first set of contacts (nos. 1-3) 360 are wired together to control station-wide alerts to existing infrastructure 370. A second set of contacts (nos. 4-6) 380 are separately wired to individual inputs 212. Each of individual inputs 212 may be predefined to detect a different type of alert (e.g., a squad alert for a first input and an engine alert for a second input) or combinations of individual inputs 212 may be detected to define additional types of alerts (e.g., all individual inputs 212 pulled low signals a squadron alert). In some embodiments, each relay indicates a different type of dispatch call. For example, as shown in table 1 (described subsequently) R1 indicates an all-call, R2 indicates an engine dispatch, R3 indicates a truck dispatch, and R4 indicates a squad dispatch. A second FSAS station-alert receiver, which includes a second set of relays R5-R8 (not shown), is configured so that R5 indicates a rescue dispatch and R8 indicates a chief dispatch.

Figure 4:
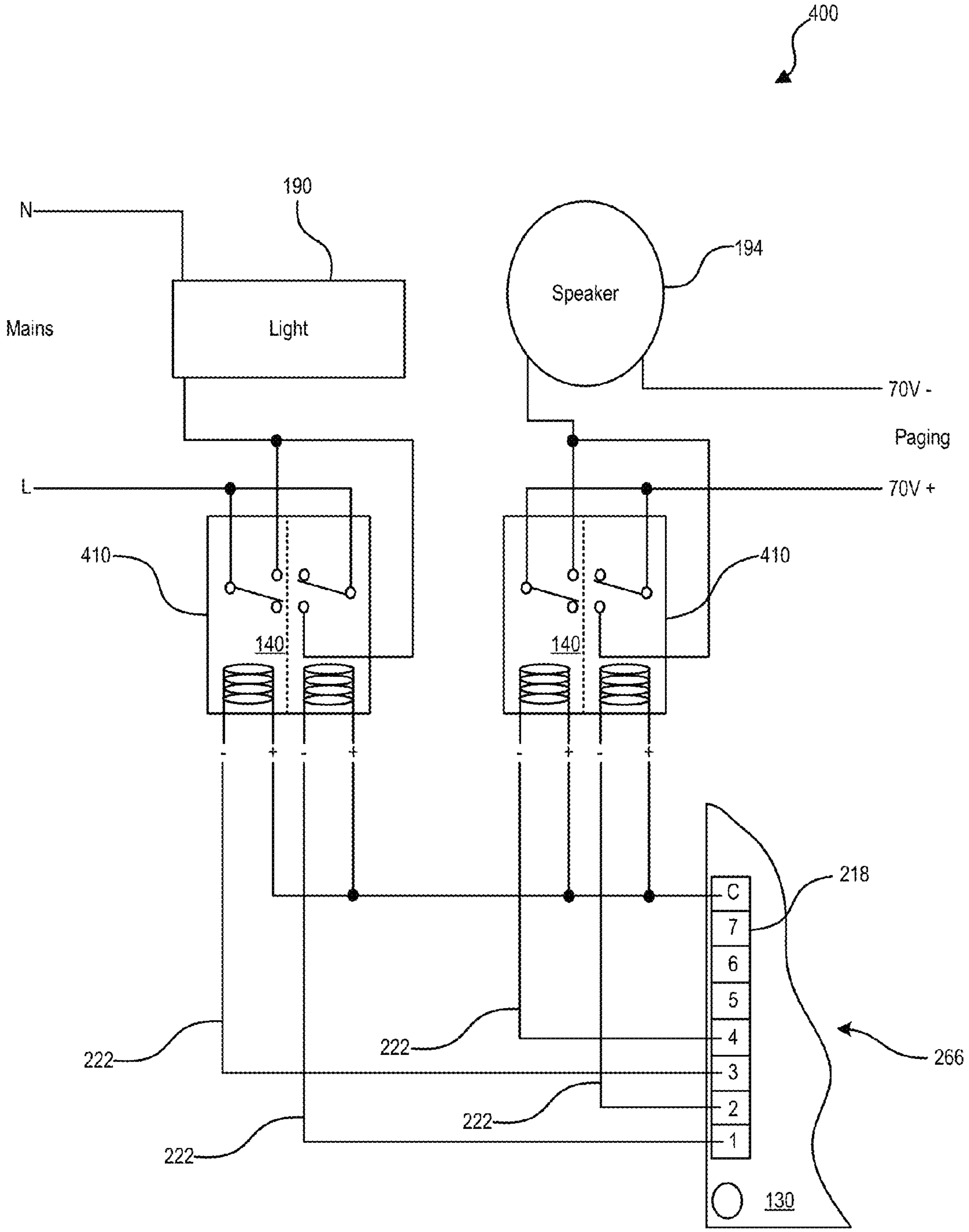
FIG. 4 is a block diagram showing connections between a selector-interface slave module and local room relay for connections between existing alert lighting and paging speakers.

FIG. 4 shows zone relay connections 400, which define how selector-interface slave modules 130 interface with existing alerting system infrastructure such as lights 190 (FIG. 1) and paging speakers 194 (FIG. 1) in a typical zone. Two standard off-the-shelf dual relays in box (RIB) 410 are STDP with an activation coil that operates at 12 VDC. These relays 410 act as both a control (to open and close circuits based on an alert command) and also as a fail-safe (to restore existing alert circuits in case of a power failure). Cabling 222 is field installed between relays 410 and relay outputs 218 of assembly 266.

Figure 5:
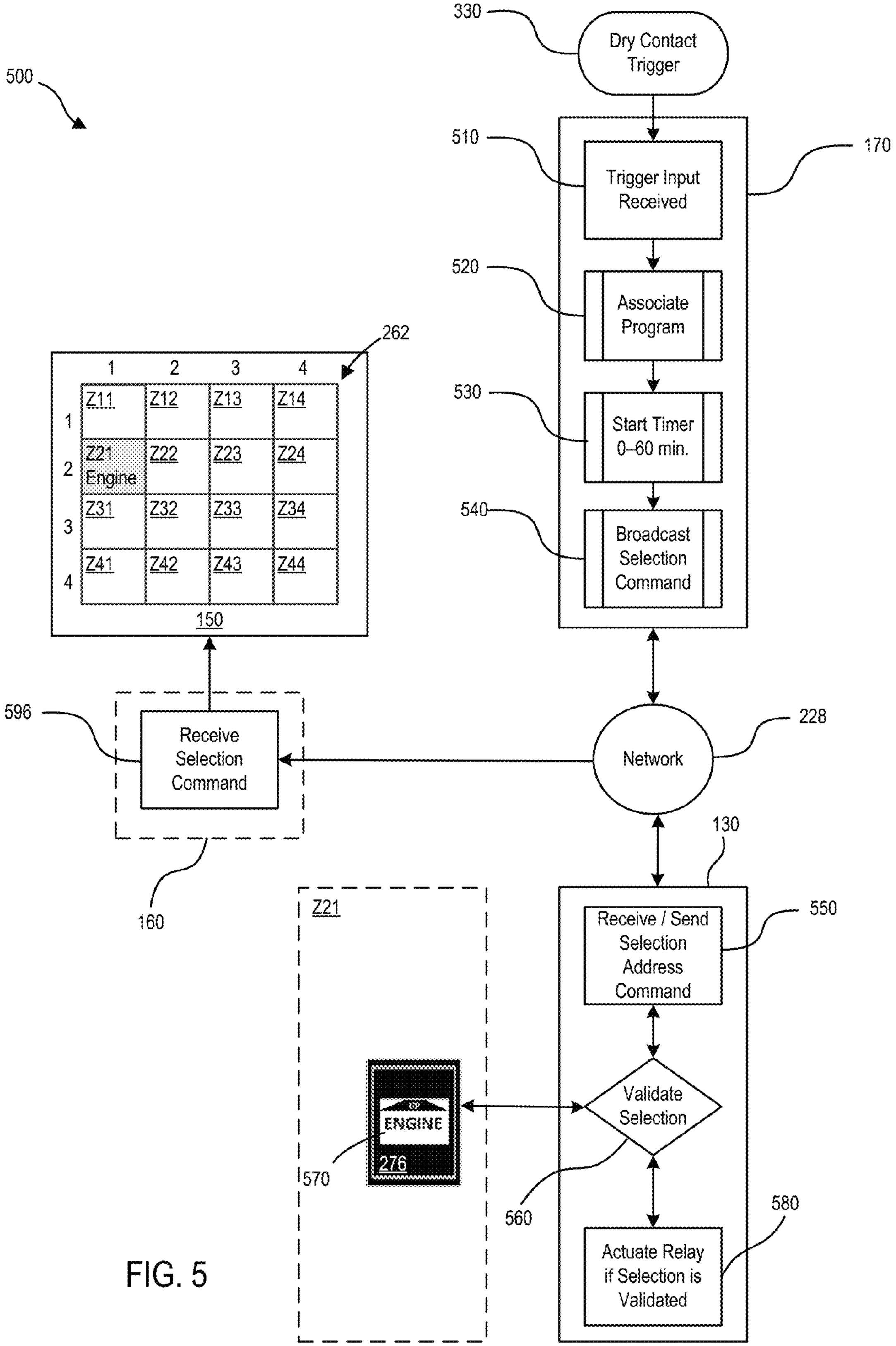
FIG. 5 is a block diagram showing interactions between the components of FIG. 2.

FIG. 5 is a high-level flowchart 500 showing how system 200 handles dispatch alarm calls received by existing FSAS station-alert receiver 180, as well as showing user interaction with alert-configuration selector switch 276 during a process of assigning a zone to receive alerts designated for a particular vehicle (apparatus). Also shown are details of triggering of relays in connection with a dispatch alert call and how a selection is presented on an organic light-emitting diode (OLED) display region of alert-configuration selector switch 276.

Master module 170 continuously monitors dispatch alert calls, all slave modules, and host computer requests. Master module 170 also continuously polls all address settings, broadcasts all dry contact input triggers, and maintains time and date information broadcast to slave modules so that they can update the time on user interface 120 (FIG. 1). Accordingly, although system 200 may handle multiple simultaneous alerts and selections, the following paragraph provides a description of a response to a single alert call.

The RS-485 bus uses a master-slave architecture, in which each device on the RS-485 bus has a unique address identifier (ID). In some embodiments, master module 170 transmits through the bus commands that are addressed (e.g., sequentially) to different IDs in system 200, such that each slave module has an opportunity to respond immediately after its ID is polled. The default request to send (RTS) state is off, which means that all devices on the bus are normally in a receive state waiting to receive data (either a command or a response to a command) from one of the other devices on the bus.

A typical transmit and receive scenario is as follows. First, master module 170 switches to a transmit state and transmits a command to query an addressed device, at which point master module 170 immediately switches back to a receive state awaiting a response. Second, a selector-interface slave module 130 (or display-driver slave module 160) having an ID matching that of the command query address ID switches to a transmit state and transmits its response, at which point it immediately switches back to a receive state. According to some embodiments, the types of commands include the aforementioned query message or other types of status query message, graphics related messages (e.g., time-of-day to be displayed), programming messages, trigger messages, and other messages.

Master module 170 monitors its inputs 212 to detect signals from contacts 380 of outputs 330, as explained previously with reference to FIG. 3. When dry contacts trigger, master module 170 detects 510 the trigger and determines which apparatus is being dispatched based on the pin location of input 212 that is triggered. According to some embodiments, master module 170 associates 520 the trigger using a programming table (e.g., tables 1 and 2) that maps the pin location to a desired resource. A valid trigger causes master module 170 to start 530 a latch timer. Information about the alert is then broadcast 540 to all selector-interface slave modules 130 via network connection 228.

The broadcast information is then received 550 by selector-interface slave module 130 that validates 560 the information against a current resource selection 570 (i.e., engine) previously made to alert-configuration selector switch 276 of zone Z21. Upon confirming that the alert resource specified in the information matches current selection 570, relay outputs 218 (FIG. 4) are actuated 580 to control external devices associated with the specific alert. Based on specific timing configurations of existing FSAS station-alert receiver 180, relays are held on for any duration of time (e.g., between one and 60 minutes) of the latch timer—typically five minutes is used. Once the time has expired, relays of system 200 are switched to an off status.

Tables 1 and 2 show how inputs 212 and 220 are mapped to relay outputs 218. Hexadecimal numbers in the table define which outputs are activated in response to a particular input trigger. For example, 01H (0001b) indicates a first output of relay outputs 218 should be actuated, 02H (0010b) indicates a second output of relay outputs 218 should be actuated, 03H (0011b) indicates both the first and second outputs should be actuated, 04H (0100b) controls the third output, 05H (0101b) controls both the first and third outputs, and so forth. As explained previously, the first output controls relays 410 (FIG. 4) for an external light 190 and the second output controls relays 410 (FIG. 4) for an external speakers 194.

TABLE 1

| | Main Trigger Inputs (212)/ Relay Outputs (R1-R8) | | | | | | | |
|---|---|---|---|---|---|---|---|---|
| Relay Outputs (218) | 1 All Call | 2 Engine Call | 3 Truck Call | 4 Squad Call | 5 Rescue Call | 6 Other | 7 Other | 8 Chief call |
| of Master Module 170 | 02H | 02H | 02H | 02H | 02H | 02H | 02H | 02H |
| of Slave Module 160 (Watchman) | 03H | 03H | 03H | 03H | 03H | 03H | 03H | 03H |
| of Slave Module 130 Having Resource Selection "All" | 03H | 00H | 00H | 00H | 00H | 00H | 00H | 00H |
| of Slave Module 130 Having Resource Selection "Engine" | 03H | 03H | 00H | 00H | 00H | 00H | 00H | 00H |
| of Slave Module 130 Having Resource Selection "Truck" | 03H | 00H | 03H | 00H | 00H | 00H | 00H | 00H |
| of Slave Module 130 Having Resource Selection "Squad" | 03H | 00H | 00H | 03H | 00H | 00H | 00H | 00H |
| of Slave | 03H | 00H | 00H | 00H | 03H | 00H | 00H | 00H |

TABLE 1-continued

| Relay Outputs (218) | Main Trigger Inputs (212)/ Relay Outputs (R1-R8) | | | | | | | |
|---|---|---|---|---|---|---|---|---|
| | 1 All Call | 2 Engine Call | 3 Truck Call | 4 Squad Call | 5 Rescue Call | 6 Other | 7 Other | 8 Chief call |
| Module 130 Having Resource Selection "Rescue" of Slave Module 130 Having Resource Selection "Chief" | 03H | 00H | 00H | 00H | 00H | 00H | 00H | 03H |

TABLE 2

| Relay Outputs | Aux. Trigger Inputs (220) | | | | | | | |
|---|---|---|---|---|---|---|---|---|
| (218) | 1 | 2 | 3 | 4 | 5 | 6 | 7 | 8 |
| of Master Module 170 | 01H | 02H | 04H | 08H | 00H | 00H | 00H | 00H |
| of Slave Module 160 (Watchman) | 01H | 02H | 04H | 08H | 00H | 00H | 00H | 00H |
| of Slave Module 130 Having Resource Selection "All" | 01H | 02H | 04H | 08H | 00H | 00H | 00H | 00H |
| of Slave Module 130 Having Resource Selection "Engine" | 01H | 02H | 04H | 08H | 00H | 00H | 00H | 00H |
| of Slave Module 130 Having Resource Selection "Truck" | 01H | 02H | 04H | 08H | 00H | 00H | 00H | 00H |
| of Slave Module 130 Having Resource Selection "Squad" | 01H | 02H | 04H | 08H | 00H | 00H | 00H | 00H |
| of Slave Module 130 Having Resource Selection "Rescue" | 01H | 02H | 04H | 08H | 00H | 00H | 00H | 00H |
| of Slave Module 130 Having Resource Selection "Chief" | 01H | 02H | 04H | 08H | 00H | 00H | 00H | 00H |

In some embodiments, master module 170 is configured to initialize each slave module with a mapping, such as the mapping defined in tables 1 and 2. Thus, master module 170 broadcasts which of its inputs was triggered and each slave module responds by checking its resource selection and actuating the appropriate outputs according to the corresponding hexadecimal value in the mapping. For example, when R1 is triggered for an all-call dispatch, master module 170 sends this information to all slave modules in a binary serial bit stream. Slave modules receive the information and check their mapping (i.e., table 1). In this example, because table 1 shows a 03H for all possible resource sections under the R1 trigger, each slave module 130 will actuate both first and second 12 VDC outputs to actuate external relays for a speaker and a light. In another example, R2 is triggered for an engine call, in which case master module 170 sends this information to all slave modules in another binary serial bit stream. In this case, however, just modules 130 having an "Engine" resource selection will close 12 VDC outputs to active speaker and light external relays.

With reference to alert-configuration selector switch 276 and establishing current selection 570, selector-interface slave module 130 sends 550 (broadcasts) both its switch selection and address information across network connection 228. Display-driver slave module 160 receives 596 selection and address information and, based on the information, generates to SPI commands to update display panel 150. Display panel 150, in response to the SPI commands, presents associated text and color on one of 16 regions 262 having an address that corresponds to that of zone Z21.

According to some embodiments, a daily reset of previous selections made to alert-configuration selector switches is programmed to reset the switches at a desired time. This forces individuals into a habit of reselecting their assigned apparatus each day (or at another interval). For example, the switches may be reset at 7:00 PM (e.g., before bedtime). If no selection is made after that, the zone receives all alerts, so it is in the user's best interest to not forget to make a selection after the reset.

Figure 6:
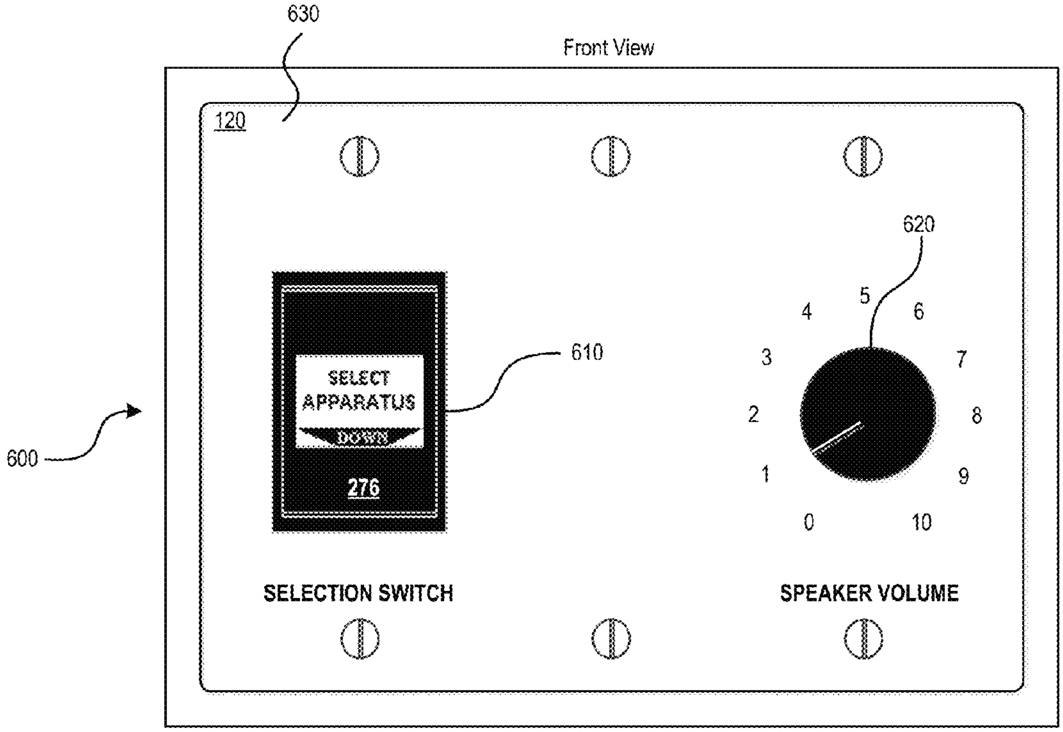
FIGS. 6 and 7 are front and rear elevation views of a user interface including an alert-configuration selection switch and a volume control mounted in a three-gang electrical faceplate.

FIG. 6 shows, according to one embodiment, a user interface 600 that includes as alert-configuration selector switch 276 an OLED, a programmable rocker switch 610 for selecting alerts that are desired for the zone, and an independent volume control 620 for adjusting volume levels of an existing paging system. Rocker switch 610 and volume control 620 are mounted in a custom cut, stainless steel, three-gang electrical faceplate 630.

According to one embodiment, rocker switch 610 is an OLED SmartSwitch™ Rocker (part no. IS18WWC1VV) available from NKK Switches of America, Inc. of Scottsdale, Ariz. This programmable device includes a white monochrome OLED display featuring sharp contrast and high resolution with 96×64 pixels, which provides a wide viewing angle of 180° and a large 0.92" display with suitable contrast. It is a multifunction and programmable device. The multiple functions include updating display menus based on up or down (rocker) presses and providing an output indicating the currently displayed menu in response to a center press (e.g., to enter a selection indicated by the display menus).

Figure 7:
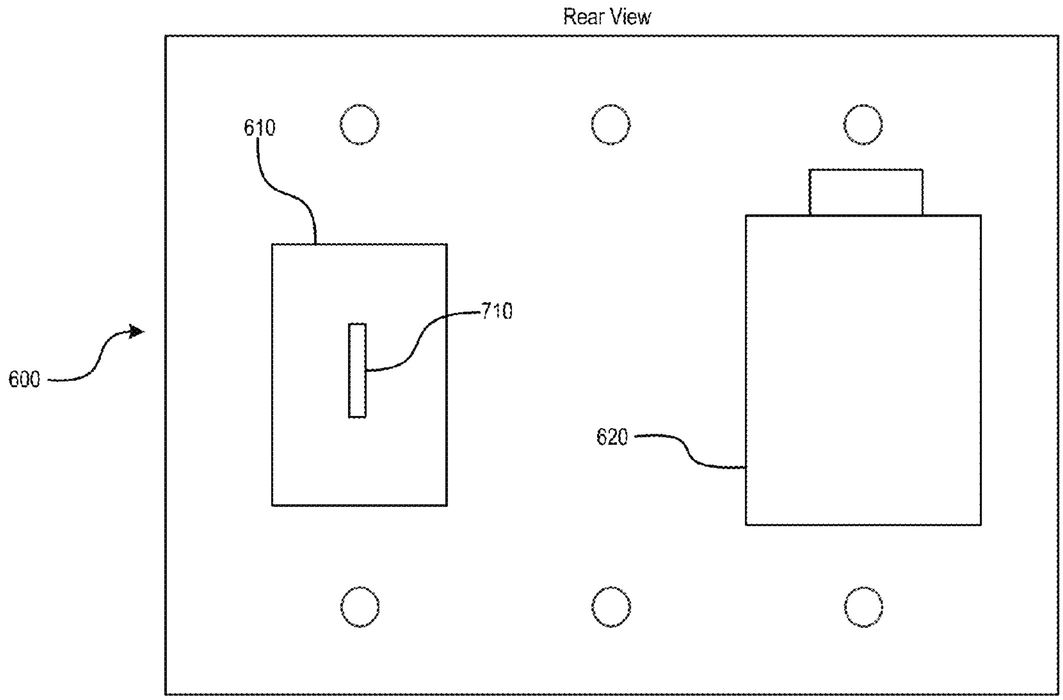

Rocker switch 610 uses the SPI to communicate with and receive commands from an associated selector-interface slave module 130. Accordingly, FIG. 7 shows that rocker switch 610 has a connector 710 that provides a connection to selector-interface slave module 130 via cable assembly 270 (FIG. 2).

In the present embodiment, a user presses down to update a display showing an available resource selection, and locks in the resource selection for the zone by pressing up. For example, when the user presses down, an SPI request for a display graphic is generated and sent to an associated slave module. That slave module processes the request and provides a SPI response including the proper graphic for presenting on the display the next selectable resource. Accordingly, selector-interface slave modules 130 store graphics for rocker switches 610, which are dynamically transferred for changing the display menus. In other words, display menus are updated dynamically from a slave module each time a user presses down so that the display shows the desired text and related graphics. In some embodiments, display menu graphics for an entire system may be changed by accessing master module 170 and requesting it propagate new graphics to slave modules through network connection 228.

The SmartSwitch also allows for dimming of display intensity. The SmartSwitch backlight may be programmed to turn off after a specific duration of time following the last use, typically 30 seconds. This feature reduces ambient light generated by the SmartSwitch during sleep hours. A simple press of the SmartSwitch restores backlight condition, allows new selection, and restarts the backlight 12 VDC power supply with battery backup in case of power failure.

Volume control 620 is a standard off-the-shelf device operating at 70/25V and allows the control of the volume level of existing alert paging speakers. Volume control 620 is mounted in a faceplate as a component of user interface 600.

FIG. 8 shows a table 800 of display image selections and explains how the selections are changed in response to user inputs made to a rocker switch 610. Note that table 800 does not specify particular graphics, but instead refers to a generic graphic "OPTION" under the "Image Description" column. For use in an FSAS, however, OPTION1 might be a "Not Selected" text graphic, OPTION2 might be an "Engine" text graphic, OPTION3 might be a "Truck" text graphic, and so forth.

With reference to table 800, when powered on, slave modules first check whether their ID is outside of a pre-defined address range (e.g., 1-16). If so, then the module updates an associated display to present a graphic located at an address 16 (10H), which is shown in FIG. 8 as a user defined ERROR graphic. In this case, the ERROR graphic is shown with a "00" error code. In this mode, the module does not participate in communication and simply remains in this mode. Thus, pressing the associated rocker switch results in no change of displayed graphics. But if the ID is within the acceptable address range, the module presents on the associated display a graphic located at the address 17 (11H), which indicates the module is being programmed (e.g, it is receiving a mapping of the type shown in tables 1 and 2). The module then waits for master module 170 to activate it. It also stay in this mode while being programmed by master module 170. Accordingly, pressing the associated rocker switch results in no change in this mode.

After activation by master module 170, the module displays a graphic at address 1 (01H), which is shown in FIG. 8 as an OPTION1 (e.g., "Not Selected") graphic associated with a "1" mode for no selection. Other modes may be activated and graphic options may be shown on the OLED upon pressing the rocker switch as indicated in table 800.

Master module 170 continuously asks which mode a module is in as well as checking the status of inputs 212 and 220. Master module 170 continuously informs the slaves of the relay status as well as the time. Slave modules insert the time information in the image being presented and they control outputs as described previously with reference to tables 1 and 2. If communication ceases from master module 170, the OLED is updated to present an image at the address 16 (10H), which is another ERROR graphics that includes a "01" error code. The error mode continues until communication is resumed under normal operation.

Skilled persons will understand that many changes may be made to the details of the above-described embodiments without departing from the underlying principles of the invention. The scope of the present invention should, therefore, be determined only by the following claims.

The invention claimed is:

1. In a fire station alerting system (FSAS) including an FSAS station-alert receiver for a fire station that houses emergency response resources available to be dispatched in response to the FSAS station-alert receiver receiving dispatches for any one of the emergency response resources and indiscriminately actuating alert equipment throughout the fire station, the improvement comprising:

a modular zoned-alerting control system for assigning zones of the fire station to receive alerts for resources corresponding to resource selections made at different zones and thereby suppressing alerts for resources not corresponding to the resource selections, the modular zoned-alerting control system comprising a plurality of alert-configuration selector switches, a plurality of selector-interface slave modules, and a master module;

different ones of the plurality of alert-configuration selector switches being mountable within the different zones of the fire station, each alert-configuration selector switch communicatively coupled to a different one of the plurality of selector-interface slave modules and configured to signal to it, for presenting on an associated user-interface display, a resource selection from among the emergency response resources and thereby assigning an associated zone to receive an alert corresponding to the resource selection;

different ones of the plurality of selector-interface slave modules corresponding to the different ones of the plurality of alert-configuration selector switches, the plurality of selector-interface slave modules communicatively coupled to the master module to form a network of modules by which to receive from the master module an indication of a dispatched resource of the emergency response resources; and the master module including a plurality of trigger inputs electrically coupled to receive, from internal relays of the FSAS station-alert receiver, signals corresponding to different ones of the emergency response resources such that the master module detects from the signals the dispatched resource and thereby provides the indication through the network to cause a selector-interface slave module having the resource selection to convey an alert for the dispatched resource to alert equipment in the associated zone.

2. The modular zoned-alerting control system of claim 1, in which the plurality of trigger inputs are electrically coupled to dry contacts of the internal relays of the FSAS station-alert receiver.

3. The modular zoned-alerting control system of claim 2, in which the dry contacts of the internal relays comprise a first set of dry contacts, the FSAS station-alert receiver comprising a second set of dry contacts of the internal relays such that the first set facilitates flexible zoned-alerts and the second set is hardwired to dedicated alert equipment.

4. The modular zoned-alerting control system of claim 1, in which the signals include a dry contact closure on one of the internal relays, and in which an electrical-conductor location of the trigger inputs that receives the dry contact closure corresponds to the dispatched resource.

5. The modular zoned-alerting control system of claim 1, in which the master module is configured to poll the different ones of the plurality of selector-interface slave modules by transmitting commands having address identifiers matching those of the different ones of the plurality of selector-interface slave modules.

6. The modular zoned-alerting control system of claim 1, further comprising a display panel showing resource selections made in each zone of the fire station.

7. The modular zoned-alerting control system of claim 1, in which the plurality of alert-configuration selector switches are programmable rocker switches, each of which includes an integrated display comprising the associated user-interface display.

8. The modular zoned-alerting control system of claim 7, in which the programmable rocker switches are each configured to update its integrated display to present a different one of the emergency response selections in response to a user rocking the switch.

9. The modular zoned-alerting control system of claim 7, in which the programmable rocker switches are each configured to update its integrated display to reset a previous resource selection at a predetermined time of day.

10. The modular zoned-alerting control system of claim 7, in which the programmable rocker switches are each configured to receive an updated graphic to present on the integrated display by signaling to associated one of the plurality of selector-interface slave modules that a user actuated the switch.

11. The modular zoned-alerting control system of claim 7, in which the integrated display has a light emitting device configured to dim after a period of inactivity or during a prescribed time of day.

12. The modular zoned-alerting control system of claim 1, in which the network includes a serial bus controlled by the master module.

13. The modular zoned-alerting control system of claim 1, in which the FSAS station-alert receiver is a legacy transponder and the internal relays are single throw double pole (STDP) relays of the legacy transponder, and in which, in response to the legacy transponder receiving the dispatches, different ones of the STDP relays actuate to indicate which one of the emergency response resources is being dispatched.

* * * * *